Oct. 5, 1965 T. HOFFMANN 3,210,673

HYDROGEN MASER FOR GENERATING, AMPLIFYING AND/OR FREQUENCY MODULATING MICROWAVE ENERGY

Filed Jan. 5, 1960 4 Sheets-Sheet 1

INVENTOR
Tibor Hoffmann

BY Blum, Moscovitz, Friedman & Blum
ATTORNEYS

INVENTOR
Tibor Hoffman

BY Blum, Moscovitz, Friedman & Blum
ATTORNEYS

INVENTOR
Tibor Hoffman

BY Blum, Moscovitz, Friedman & Blum
ATTORNEYS

INVENTOR
Tibor Hoffmann

BY Blum, Moscovitz, Friedman & Blum
ATTORNEYS

United States Patent Office 3,210,673
Patented Oct. 5, 1965

3,210,673

HYDROGEN MASER FOR GENERATING, AMPLIFYING AND/OR FREQUENCY MODULATING MICROWAVE ENERGY

Tibor Hoffmann, Budapest, Hungary, assignor to Tavkozlesi Kutato Intezet, Budapest, Hungary, a firm
Filed Jan. 5, 1960, Ser. No. 602
11 Claims. (Cl. 330—4)

This invention relates to apparatus for furnishing microwave energy, and in particular to apparatus adapted to generate and amplify microwaves as well as to modulate the frequency thereof.

Heretofore amplification of microwaves has been effected by means of a variety of devices such as magnetrons, travelling wave tubes, etc. In order to minimize the dimensions and the noise of such known microwave amplifiers, it has further been customary to employ so-called "masers" in which the amplification is brought about in accordance with the principles of quantum mechanics by a transition of the valence electrons of a suitable substance (hereinafter called an "active substance") from a higher energy level to a lower energy level so that simultaneously microwaves having a frequency determined by the difference of these energy levels are radiated.

The basic principle of operation of most of the aforesaid known amplifiers is that an energy level of the active substance is split by application of a suitable force field and that the valence electrons being normally on the lowest levels are excited to at least one selected higher sublevel of the split energy level by being subjected to electromagnetic radiation. Under such conditions, the excited valence electrons undergo a transition from the selected higher sublevel to a lower sublevel of the split energy level, which transition is accompanied by emission or radiation of microwave energy of a frequency determined by the difference between the energy levels. When the so irradiated active substance, the energy levels of which are split, is situated in an amplification chamber, e.g. a cavity resonator, in which the microwaves to be amplified (whose frequency is equal to that of the microwaves generated by the electron transitions) are present, there is attained an amplification of the first-named microwaves due to the fact that, by virtue of the equality of the frequencies, a so-called induced transition takes place as a result of which the energy of the total radiation is increased by means of an induced emission. Another example of the aforesaid amplification chamber is a portion of a suitably constructed wave guide. The increase in energy is proportional to the energy of the microwaves to be amplified, and since both processes are in phase with one another, there occurs in the amplification chamber an energy amplification.

The excitation of the active substance to a higher energy level in the known amplifiers of the above described types is, in accordance with one established procedure, effected by irradiating the active substance with microwaves the frequency of which is higher than that of the microwaves to be amplified. It is also an established procedure to provide the desired number of electrons in the higher energy level by means of a spatial separation from one another of such atoms or molecules which have electrons at different energy levels. The first-mentioned excitation procedure, however, necessitates the use of a microwave source of higher frequency and relatively high energy output, which is, of course, expensive and technically complicated. The second procedure mentioned above requires a rather strong and non-homogeneous field the formation of which is likewise complicated. A further difficulty, which is encountered particularly in frequency modulation operations, is that the frequency of the amplified microwaves can be varied only by a change in the frequency of the irradiating energy and thus by a corresponding change in the microwave source.

It is, therefore, an important object of the present invention to provide apparatus for generating, amplifying and/or frequency modulating microwaves in a relatively broad band-width and at a possibly low noise level without low-temperature cooling so that relatively simplified and inexpensive construction and operation and maintenance are obtained.

More specifically, it is a very important object of the present invention to provide a system or apparatus of the type referred to above which can be employed as an amplifier, frequency modulator or oscillator for generation of microwaves without necessitating the use of a special microwave source for this purpose. The invention is based on the principle that suitably polarized light rays can be employed for exciting the valence electrons of the active substance to at least one predetermined energy level among the higher split energy levels. Accordingly, the invention contemplates that the electromagnetic waves for exciting the valence electrons of the active substance are polarized light rays the state of polarization of which is so chosen that the valence electrons are excited only to the selected sublevel or sublevels of the split higher energy level. For the purposes of the following description, the terms "light" and "light rays" are employed to designate not only visible radiation but also electromagnetic waves which fall into the infrared or ultraviolet portions of the spectrum.

In heretofore known microwave amplifiers of the aforesaid types, the splitting of an energy level is effected by application of a magnetic field. Upon irradiation of the active substance with visible or invisible light, the nature of the active substance, however, will determine whether a magnetic field is sufficient or whether, in lieu of only a magnetic field, either an electrical field or both an electrical and a magnetic field must be employed. This also predetermines the required manner of polarization of the light rays. The foregoing can best be understood when it is considered that for the purpose of exciting valence electrons under normal conditions by means of light absorption it is possible to employ light of any desired state of polarization. If, however, the excited energy levels are split by an application of force fields, the valence electron transitions to a predetermined one of the split levels can only be attained if the exciting light is polarized in a manner uniquely associated with that split level. By way of example, it may be that the transition of valence electrons to the selected split energy sublevel can be effected only when the light rays are planepolarized parallel to the direction of the field. For a different split sublevel, the light rays may have to be planepolarized substantially perpendicularly to the direction of the field. Under still different conditions, it may also be necessary to employ a light the polarization plane of which lies perpendicular to the field strength while the light itself is circularly polarized either to the right or to the left direction, since otherwise the valence electrons cannot be brought to the desired split energy sublevel by means of absorption of light. By suitably choosing the state of polarization, therefore, the valence electrons can be excited to a first selected split energy sublevel from which they can then go to a second selected split energy sublevel, the splitting of the levels in such a case being so effected that the transition of the electrons from the higher sublevel to the lower sublevel takes place without self-absorption, whereby microwaves having a frequency determined by the difference between these sublevels are generated and, thus, amplified.

The apparatus according to the present invention is also suited for frequency modulation of microwaves in a most simple manner. If the irradiation is effected not, as heretofore, by microwaves of predetermined frequency but rather by means of light rays, then the frequency of the radiation resulting from the electron transition is, due to the large band width of the visible, or infrared, or ultraviolet light, determined solely by the spacing between the energy levels between which the transition takes place. This spacing depends in turn on the strength of the applied force field. If, now, the field strength is changed in synchronism with the modulation voltage, the microwaves generated by the electron transition will change their frequency in the same manner. Thus the desired frequency modulation is immediately and automatically attained.

In the heretofore known amplifiers, however, the frequency of the exciting microwaves is also changed with the field strength; in other words, for the purposes of the modulation it is necessary to modulate beforehand the microwaves employed for the excitation. This disadvantage is eliminated by the apparatus according to the present invention inasmuch as the exciting light has such a band width that the modulation can be effected without special measures.

As a consequence of the construction of the chamber containing the active substance in the form of the interior space of a cavity resonator which is dimensioned for a desired frequency, the desired induced emission results as a function of the resonance oscillations of the cavity resonator when care is taken that the splitting of the excited energy levels is so chosen that the frequency determined by the separation or spacing of the energy levels associated with the electron transitions corresponds to the frequency of the microwaves to be radiated. Concurrently, of course, a corresponding state of polarization of the irradiating light is necessary. The resonator thus works as a microwave oscillator without any primary microwave source being required.

The active substance employed in accordance with the present invention can consist of solid bodies, molecular systems or free atoms, as desired. Advantageously, atoms of a monoatomic gaseous material are employed as the active substance, since in such a case the apparatus functions, for all practical purposes, completely independently of the temperature. No low temperature cooling is, therefore, required. The gaseous substance may, for example, be hydrogen. The hydrogen is confined in a suitable vessel or container where it becomes dissociated and is irradiated therein by means of exciting light rays polarized in a predetermined manner through the intermediary of a special optical system. The filling of the excited energy levels of the hydrogen atoms with electrons takes place in accordance with the selection rules of quantum mechanics and must be carried out with a suitable relationship between the polarization of the incident light and the level-splitting field. An optical system which is utilizable in this arrangement when plane-polarized light is required may comprise a mirror polarizer.

In the event that circularly polarized light is required, the optical system is preferably composed of a mirror polarizer similar to the one mentioned above in conjunction with a Fresnel rhomb made of lithium fluoride, these members being so arranged that the Fresnel rhomb circularly polarizes the plane-polarized light coming from the mirror polarizer.

As is known, the emission of energy of a light source is strongest in its resonance line which, in the case of hydrogen, is the Lyman-$\alpha$ line having a wave length of 1216 A. The Lyman-$\alpha$ line of hydrogen is greatly absorbed, however, by glass, quartz and other optical materials. In order to avoid this, i.e., for the purpose of ensuring transmission of the resonance line of hydrogen, the polarizing optical system as well as the window of the radiation source is preferably composed of lithium fluoride.

Ordinarily, of course, the hydrogen in the vessel is molecular hydrogen, and it is thus necessary to dissociate the hydrogen molecules into hydrogen atoms. This is attained by providing the container with a glowing cathode for liberating free electrons and with an anode, and by applying across these electrodes an electrical potential by means of which the free electrons emitted by the cathode are accelerated along the free path in the vessel or container, determined by the existing pressure of the molecular hydrogen, to energies of from about 8.0 to about 11.5 electron volts, the gas pressure in the container at this time being higher than the pressure at which a gas discharge would take place. As known, the dissociation energly of a hydrogen molecule is 4.45 e.v., and the dissociation of these molecules at the same time requires a kinetic energy of from about 3.55 to about 7.05 e.v. If now electrons move through the hydrogen gas while being accelerated by a static electric field and impinge against the hydrogen molecules non-elastically at energies of from 8.0 to 11.5 e.v., then each hydrogen molecule is dissociated by the energy imparted thereto by the collision into two hydrogen atoms. In this manner a great number of hydrogen atoms can be obtained which can then be excited in the previously described manner.

The foregoing and other objects, characteristics and advantages of the present invention will be more clearly understood from the following detailed description thereof when read in conjunction with the accompanying drawings, in which.

Figure 1:
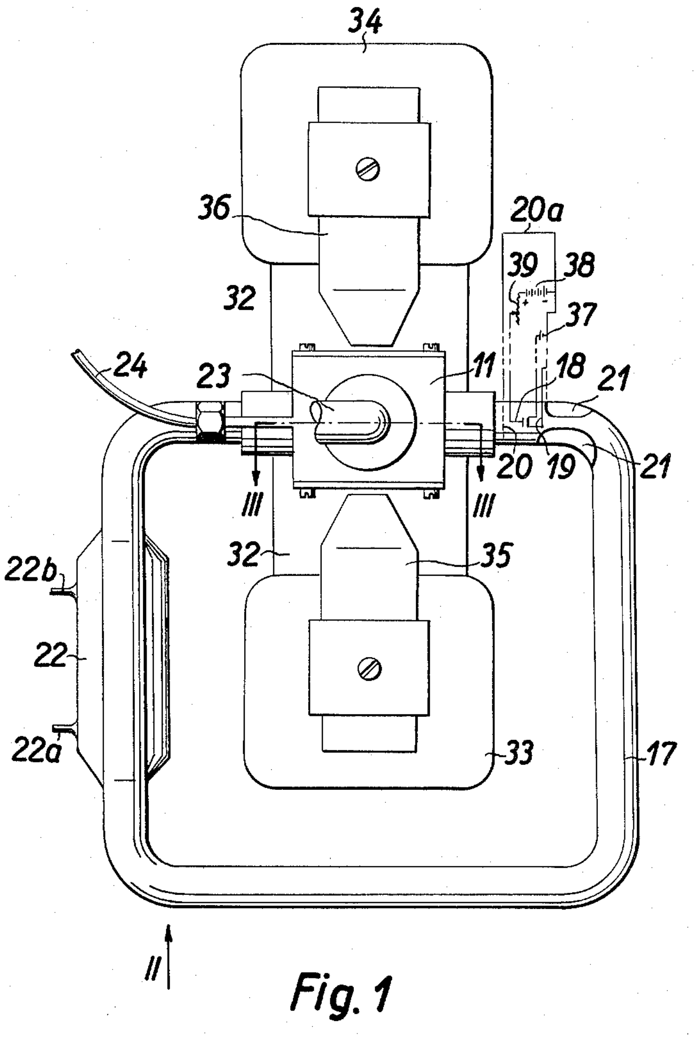
FIG. 1 is a somewhat diagrammatic plan view of an apparatus according to a preferred embodiment of the present invention.
Figure 2:
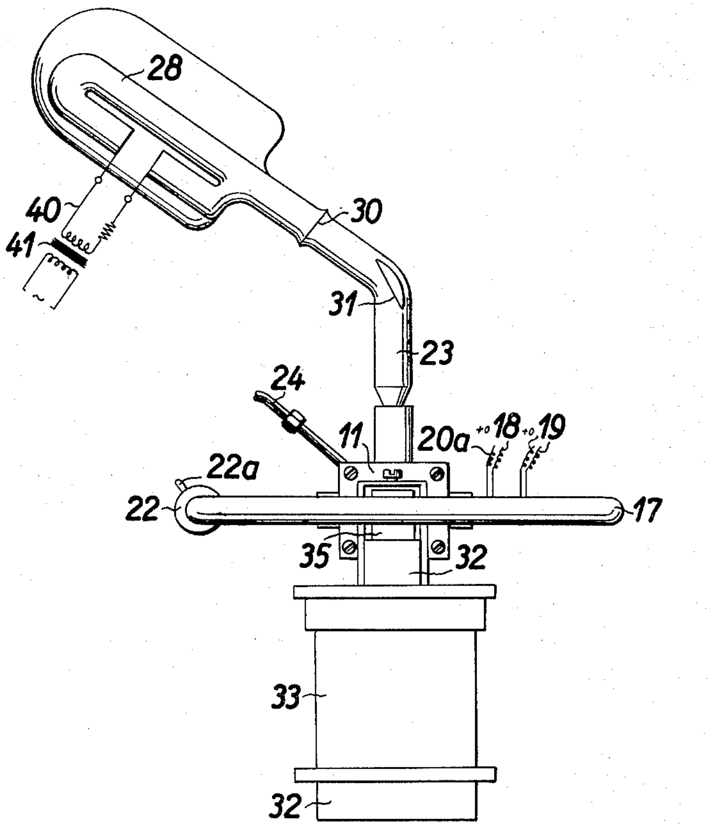
FIG. 2 is an end elevational view of the apparatus as seen in the direction of the arrow II in FIG. 1.
Figures 3, 4:
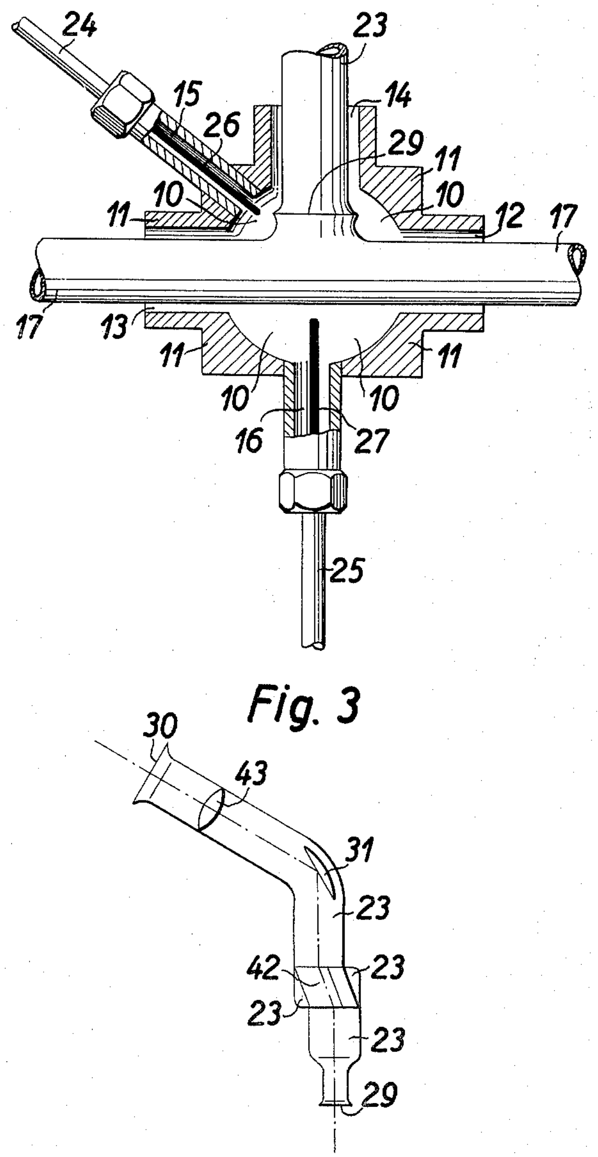
FIG. 3 is a sectional view taken along the line III—III in FIG. 1.
FIG. 4 is a diagrammatic plan view of an optical system for feeding circularly polarized light.

Referring first to FIGS. 1 to 3, it will be seen that the generation, amplification or frequency modulation of microwaves takes place in a cylindrical cavity 10 (see FIG. 3) of a prismatic body 11 made of metal, such as copper, and provided with five circular openings 12, 13, 14, 15 and 16. A glass tube 17 extends through the pair of axially aligned openings 12 and 13; the tube 17 having a circular cross-section and defining the flow path for the hydrogen gas which is to serve as the active substance hereinbefore referred to.

As can be seen from FIG. 1, the glass tube 17 is shaped in the form of a closed quadrangle. The hydrogen gas in this tube is maintained at a pressure of about 10 mm. Hg. The tube 17 is made of a material the dielectric loss and dielectric constant of which are small in the range of microwaves, for example, of a glass manufactured by the Corning Glass Works and sold under the trademark "Corning 707b." Arranged in the tube 17 just in advance of the opening 12 (i.e., looking counterclockwise in FIG. 1) is an electrode system consisting of a grid-shaped anode 18 and a cathode 19 and, in the illustrated embodiment, also of an ion trap 20 maintained at the cathode potential. At a location on the side of the cathode 19 remote from the anode 18 the tube 17 is provided with an inner portion 21 of reduced diameter. Counterclockwise of the cavity body 11, as viewed in FIG. 1, the glass tube 17 is provided with an outer jacket 22 provided with an inlet 22_a_ and outlet 22_b_, whereby cooling water or a like cooling medium may be passed through the jacket 22.

Extending through the opening 14 in the body 11 and connected to the glass tube 17 is a further glass tube 23 which constitutes a part of the means for polarizing the excitation light rays and for guiding the polarized light into the cavity 10. The remaining two openings 15 and 16 are employed for the input and output, respectively, of the microwaves which are to be amplified or modulated and to this end are connected with a pair of coaxial conductors 24 and 25, respectively. Extending from the conductors 24 and 25 and through the relatively short pipe ends defining the openings 15 and 16 are two coupling loops 26 and 27 which extend to a variable distance into the cavity 10. It will be understood that the coupling loops 26 and 27 are designed to conduct microwave energy, respectively, into and out of the cavity 10 for purposes to be more fully explained hereinafter. In the event that the cavity 10 is to be employed only for generating microwaves, then, of course, the input opening 15 and coupling loop 26 may be dispensed with.

The openings 12, 13 and 14 of the body 11 are also defined by short cut-off pipe ends or stubs which are constructed so as to damp any frequencies less than the limiting frequency for the purpose of reducing losses from the cavity through these openings and reducing the entry of noise from the outside into the cavity 10. The damping means, i.e., the pipe ends, which are in the form of short tubular conductor sections of predetermined diameter, effect a damping of at least 50 db at the operating frequency of the cavity 10.

The end of the light polarizing and guiding glass tube 23 remote from that end of the latter connected to the glass tube 17 is connected to a hydrogen discharge tube 28 (see FIG. 2) from which the excitation light emanates. The discharge tube 28, which is of conventional construction, is connected to the secondary 40 of a step-up transformer 41 which provides a voltage of about 3.8 kv. The interior space of the glass tube 23 is separated from the interior spaces of the glass tube 17 and of the discharge tube 28 by respective windows 29 and 30 made of lithium fluoride and having a thickness of 0.5 mm. The pressure in the glass tube 23 is approximately $10^{-4}$ mm. Hg. At an intermediate portion of the tube 23 it is bent to form an angle of $126°\pm2°$. In the knee so formed there is arranged a mirror polarizer 31 also made of lithium fluoride, the arrangement being such that the ultraviolet light coming from the hydrogen discharge tube 28 is incident on the reflecting surface of the mirror at an angle of $63°\pm1°$, corresponding to that polarizing angle (as used in Brewster's law) which is associated with the index of refraction corresponding to the wave length 1216 A. of the Lyman-$\alpha$ line. As a result of this, the light reflected from the surface of the member 31 is plane-polarized and enters the interior of the glass tube 17 through the lithium fluoride window 29. Accordingly, the electric vector or field strength of the advancing light is parallel to the plane of the mirror polarizer 31 and perpendicular to the direction of propagation of the light. The arrangement is such that the irradiated section of the glass tube 17 traverses the cavity 10 at the location of the highest electric field strength, the direction of the electric field strength or intensity of the arriving light being parallel to the generatrices of the cylindrical cavity 10.

Referring to FIGS. 1 and 2 in particular, it will be seen that an electromagnet 32 provided with windings 33 and 34 and with poles 35 and 36 is arranged below the plane of the tube 17, the poles 35 and 36 being disposed in the plane of the body 11. The magnetic flux of the magnet 32 thus traverses the cavity 10, whereby there is generated in a direction parallel to the electric field strength in the cavity 10 a homogeneous magnetic field having a strength of about 2000 gauss.

As further shown in FIG. 1, a small battery 37 is connected to the cathode 19 to provide the heating current therefor. Connected between the cathode and the anode 18 is a bias battery 38 and a potentiometer 39 by means of which the potential difference between the anode and cathode can be regulated. The ion trap 20 is connected by a conductor 20*a* to the negative terminal of the battery 38 and thus is at cathode potential.

The operation of the apparatus illustrated in FIGS. 1 to 3 is as follows:

Upon switching on of the heating current generator or battery 37, the cathode 19 in the glass tube 17 begins emitting electrons while at the same time the hydrogen gas in the vicinity of the cathode 19 is heated. The emitted electrons are accelerated toward the positive anode 18 by means of the potential difference applied across the anode and cathode by the battery or voltage source 38 and potentiometer 39. Concurrently, the hydrogen gas begins to stream in the same direction since the pressure drop of the cooled hydrogen gas flowing in the portion of the tube 17 surrounded by the cooling jacket 22 effects a suction on the heated gas located in the vicinity of the cathode 19. Reverse flow of gas through the tube 17 is inhibited by the reduced diameter section 21 of the latter. Some of the accelerated electrons will, of course, collide with some of the hydrogen molecules between the electrodes, and the impacts are such as to effect a dissociation of the molecules into hydrogen atoms. Thus it will be understood that a part of the hydrogen gas flowing through the cavity 10 is in its atomic state.

In case of right or left circularly polarized light being required for feeding, the optical system between the windows 29 and 30 will be replaced by an optical system shown in FIG. 4. In this system the plane polarized light supplied by the mirror polarizer 31 becomes right or left circularly polarized by a Fresnel rhomb 42 made of lithium fluoride. According to whether right or left circularly polarized light is required, the Fresnel rhomb 42 occupies a position wherein its rhombic side surfaces which are parallel to the light rays enclose an angle of 45° with the plane of the drawing. This angle is above said plane as shown or below it as the case may be, the axis of angular displacement being the direction of incident light.

An optical system consisting of, e.g., a simple condenser lens 43 made of lithium fluoride and situated before said polarizing optical system serves for increasing the efficiency of the discharge tube 28. Like means may be provided also in the embodiment shown in FIGS 1 to 3.

Figure 5:
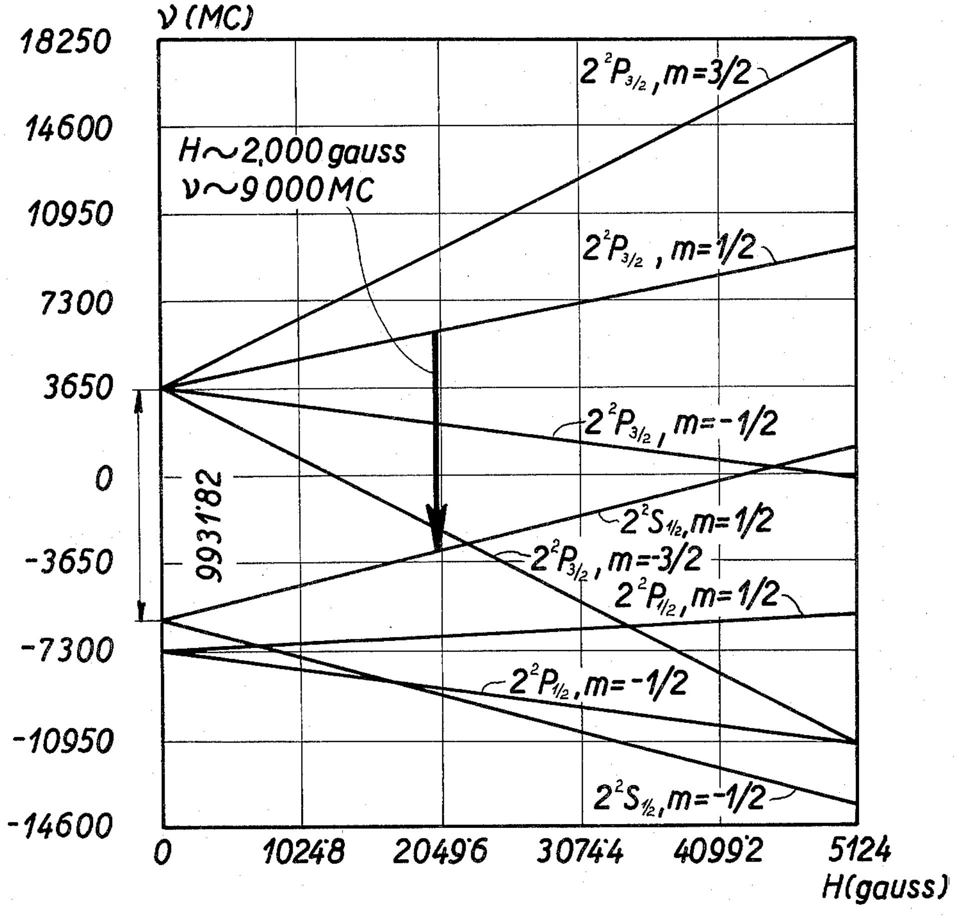
FIG. 5 is an energy level splitting diagram for hydrogen in its first excited state.

As is well known, the magnetic field intensity in the cavity 10 causes the energy level of the hydrogen atoms in the normal or ground state thereof to be split into two sublevels while the energy levels of these atoms in their first excited state are split into eight sublevels. The relative arrangement of the separate sublevels of the first excited state as a function of the strength of the energy level-splitting magnetic field is illustrated in FIG. 5, the authority for this diagram being found on page 333, FIG. XII.5 of "Molecular Beams" by N. F. Ramsay (Clarendon Press, Oxford 1956). Under the influence of the excitation light which is polarized parallel to the direction of the magnetic field, electrons reach (among others) the energy level $2^2P_{3/2}$, $m=\frac{1}{2}$, while the energy level $2^2S_{1/2}$, $m=\frac{1}{2}$ remains unoccupied due to the fact that a transition into this energy level is forbidden. If, now, the electrons occupying the first-mentioned energy level transit to the lower energy level $2^2S_{1/2}$, $m=\frac{1}{2}$, there are generated electromagnetic oscillations having a frequency $$\nu=9913.82-0.47H \text{ mc.} \qquad (1)$$

wherein H is the strength of the magnetic field in gausses. In the apparatus according to the illustrated embodiment of the invention, the operational state of which is represented by the heavy downwardly pointing arrow in FIG. 5, at a field strength of $H=2000$ gausses there are generated oscillations at a frequency of 8973.52 mc., i.e., at a frequency of approximately 9000 mc. The cavity 10, accordingly, is dimensioned for this frequency.

Of the radiation emanating from the hydrogen discharge tube 28, only the ultraviolet light corresponding to the Lyman-$\alpha$ line is utilized in the apparatus. As previously stated, the windows 29 and 30 are made of lithium fluoride and effectively vacuum conditions are maintained in the glass tube 23 in order to ensure that this light may reach the glass tube 17 in a polarized state with a minimum of losses and to ensure further that the sublevel $2^2P_{3/2}$, $m=\frac{1}{2}$ can become filled with electrons from a greater than usual number of hydrogen atoms due to the excitation action of the ultraviolet light. Tests have shown that by means of an apparatus in accordance with the present invention approximately 17% of the incident light can be utilized.

As can be understood from the technical literature, the hydrogen molecules in the glass tube 17 will be dissociated to the greatest extent upon colliding with free electrons when the condition $$\frac{V_0}{l_p}=40 \tag{2}$$

obtains, wherein $V_0$ is the potential between the anode 18 and the cathode 19 in volts, $l$ is the distance between the electrodes in cm., and $p$ is the pressure of the hydrogen gas in mm. Hg, as set forth in an article by S. J. Corrigan and A. von Engel, Proc. Roy. Soc. A 245, (1958) page 335. In the apparatus according to the illustrated embodiment of the invention, $V_0=240$ v., $l=6$ mm. (0.6 cm.) and $p=10$ mm. Hg. The number N of hydrogen atoms formed per second per cubic centimeter is given by the equation $$N=6.25(10^{17})\frac{W}{d_0q} \tag{3}$$

wherein W is the power between the anode 18 and the cathode 19 in watts, $d_0$ is the distance between the anode and cathode in cm., and $q$ is the cross-sectional area of the glass tube 17 in cm.$^2$.

It will, of course, be understood that as many as possible of the hydrogen atoms must be passed through the cavity 10 before they can be permitted to recombine into hydrogen molecules. To this end, there is maintained in the glass tube 17 a high flow velocity, e.g. 50 cm./sec. (to which reference will again be had hereinafter), while the inner surface of the tube 17 is coated with metaphosphoric acid for the purpose of inhibiting the recombination action. Some recombination will take place, however, throughout the space or gap between the anode 18 and that part of the glass tube 17 located between the electromagnet poles 35 and 36, such recombination being effected by means of a simultaneous triple collision between two hydrogen atoms and one hydrogen molecule in accordance with the differential equation $$\frac{dn_H}{dt}=-2Kn_{H_2}(n_H)^2 \tag{4}$$

as is explained in "Lehrbuch der chemischen Physik" by A. Eucken, Bd II/1, 2nd edition, Leipzig (1943). In this equation $n_H$ is the number of hydrogen atoms per cubic centimeter, $n_{H_2}$ is the number of hydrogen molecules per cubic centimeter, $t$ is the time, and K is a recombination constant expressed by the relation $$K=3.58(10^{-32})\text{cm.}^6/\text{sec.}) \tag{5}$$

In order to calculate the extent of the recombination taking place between the anode 18 and the cathode 19, the quantity N as defined by Equation 3 must be added to the right-hand side of Equation 4. With respect to this space, the differential Equation 4 may be solved as follows:

$$n_H=\sqrt{\frac{N}{2Kn_{H_2}}}\tanh\left(t\sqrt{2KNn_{H_2}}\right) \tag{6}$$

wherein $n_{H_2}$ is kept constant. If the flow velocity is designated by V and the distance between the anode 18 and the cathode 79 by $d_0$, then by setting $$t=\frac{d_0}{V} \tag{7}$$

the value $n_H$ corresponding to the beginning of the recombination without dissociation can be found from Equation 6. If this value is designated by $n_{H_0}$, then it will be seen that $$n_{H_0}=\sqrt{\frac{N}{2Kn_{H_2}}}\tanh\left(\frac{d_0}{V}\sqrt{2Kn_{H_0}}\right) \tag{8}$$

If at a given instant of time $t=0$ the equation $n_H=n_{H_0}$ holds while $n_{H2}$ is constant, then the solution of differential Equation 4 is $$n_H=\frac{n_{H_0}}{1+(2Kn_{H_0})\,t} \tag{9}$$

The number of hydrogen atoms per cubic centimeter present in the active space region located in the center of the cavity 10 is, therefore, $$n_H=\frac{\sqrt{\frac{N}{2Kn_{H_2}}}}{\frac{d_1}{V}\sqrt{2KNn_{H_2}}+\coth\left(\frac{d_0}{V}\sqrt{2KN_{H_2}}\right)} \tag{10}$$

wherein, $d_1=Vt$ designates the distance between the center of the cavity 10 and the anode 18.

As will be understood from the foregoing, $n_H$ will reach it maximum value when $$V=\frac{d_0\sqrt{2KNn_{H_2}}}{\sinh^{-1}\sqrt{\frac{d_0}{d_1}}} \tag{11}$$

in which case $$n_H=\frac{\sqrt{\frac{N}{2Kn_{H_2}}}}{\sqrt{1+\frac{d_1}{d_0}+\frac{d_1}{d_0}\sinh^{-1}\sqrt{\frac{d_0}{d_1}}}} \tag{12}$$

The optimum value of V is found to be, in the illustrated embodiment of the invention, approximately 50 cm./sec., as already set forth hereinbefore.

If the $n_H$ hydrogen atoms located in the active space region of the glass tube 17 between the magnet poles 35 and 36 are subjected to the hereinbefore described polarized light with a frequency corresponding to the Lyman-$\alpha$ line and with power $P_0$, and if in addition there are introduced into the cavity 10 microwaves to be amplified and having power $P_1$, then the power provided by the active hydrogen atoms per cubic centimeter is $$P_e=\frac{Cn_HQP_0P_1}{\nu R^2Dq_0} \tag{13}$$

wherein $P_e$, $P_0$ and $P_1$ are expressed in watts, Q is the quality factor of the cylindrical cavity 10, R the radius of the cavity 10 in cm., $d$ the height of the cavity 10 in cm., $q_0$ the cross-sectional areas of the exciting bundle of light rays in cm.$^2$, and $\nu$ the frequency of the microwaves to be amplified. C is a constant which for the purpose of the illustrated embodiment of the invention is given by the relation $$C=4.13(10^{-8}) \tag{14}$$

Accordingly, the total microwave power reaching the cavity 10 of the apparatus, which is operating as an amplifier, is $P_e+P_1$. Energy leaves the cavity 10 via the output opening 16 and coupling loop 27 with power of $\alpha(P_e+P_1)$, wherein the magnitude $\alpha<1$ depends on the output. This means that any change in the depth of insertion of the output coupling loop 27 brings about a change in the quality factor Q of the cavity. As a consequence, the factor $P_1$ in Equation 13 must be replaced by the factor $(1-\alpha)$ $(P_e+P_1)$, so that $$P_e=\frac{4.32(10^{-8})(n_HQP_0P_1)(1-\alpha)}{\nu R^2Dq_0-4.31(10^{-8}n_HQP_0)(1-\alpha)} \tag{15}$$

The output power thus may be expressed as $$P_{\text{out}}=\alpha(P_e+P_1)=\frac{\nu R^2 D q_0 \alpha P_1}{\nu R^2 D q_0-4.31(10^{-8} n_H P Q_0)(1-\alpha)} \qquad (16)$$

and the amplification of the system as $$G=\frac{P_{\text{out}}}{P_1}=\frac{\nu R^2 D q_0 \alpha}{\nu R^2 D q_0-4.31(10^{-8} n_H Q P_0)(1-\alpha)} \qquad (17)$$

The amplification is always greater than unity, i.e. $G>1$, when the relation $$\frac{1}{1-\alpha}>\frac{4.31(10^{-8} n_H Q P_0)}{\nu R^2 D q_0}>1 \qquad (18)$$

holds true.

The system becomes self-exciting, i.e., it will function as an oscillator, when the relation $$\frac{4.31(10^{-8} n_H Q)}{\nu R^2 D}\cdot\frac{P_0}{q_0}=\frac{1}{1-\alpha} \qquad (19)$$

is satisfied. Correspondingly, the degree of amplification and the manner of operation of the system (either amplification or oscillation) can most efficaciously be controlled by variation of the factor $\alpha$.

In order to obtain a large quotient $P_0/q_0$ it is necessary to employ a hydrogen discharge tube of the greatest possible power-area ratio. In the illustrated embodiment of the invention, therefore, the total energy output of the hydrogen discharge tube 28 is 1500 watts. As already indicated hereinbefore, the quality factor Q of the cavity 10 is enhanced by making the glass elements of the apparatus located within the cavity 10 of the special type of glass known under the trade-mark "Corning 707b."

If the apparatus is to be employed as a modulator, the magnetic field must be varied in accordance with the desired modulation. For this purpose there is provided on the iron core of the magnet 32 an additional winding incorporated in the windings 33 and 34 to which the modulating current is conducted. Inasmuch as the frequency corresponding to the transition between the split sublevels $2^2P_{3/2}$, $m=\frac{1}{2}$ and $2^2S_{1/2}$, $m=\frac{1}{2}$ is $$\nu=9913.82-0.47H \qquad (1)$$

a frequency change $\Delta\nu$ attained by virtue of a change of field strength $\Delta H$ may be expressed as $$\Delta\nu=0.47\Delta H \qquad (20)$$

wherein $\Delta\nu$ is expressed in mc. and $\Delta H$ in gausses.

What is claimed is:

1. In an apparatus for generating, amplifying and/or frequency modulating microwave energy, which apparatus is equipped with means supplying an active substance in the form of atomic hydrogen the atoms of which can undergo transitions from a relatively lower ground state energy level to at least one relatively higher excited state energy level, means for establishing a magnetic field across the location of said active substance so as to split each of said energy levels into a plurality of sublevels, means supplying electromagnetic radiation adapted to excite the valence electrons of said atoms of said active substance to at least one of the higher split energy sublevels, and means for directing said electromagnetic radiation against said active substance within the region of said magnetic field; said electromagnetic radiation being light rays, and said apparatus further comprising means for imparting to said light rays prior to incidence of the latter on said active substance such a state of polarization as to ensure that said valence electrons are excited to at least a first preselected higher one of said higher split energy sublevels and as to prevent transitions of said valence electrons into second lower preselected one of said higher split energy sublevels, whereby return of said electrons from said first preselected split energy sublevel to said second preselected split energy sublevel results in radiation of microwave energy the frequency of which is determined by the difference between said preselected first and second energy sublevels.

2. In an apparatus according to claim 1; said gaseous material being atomic hydrogen, said apparatus further comprising a closed vessel containing said hydrogen and extending through said cavity of said cavity resonator means, said means for polarizing said light rays comprising an optical system operatively combined with said means for directing said light rays against said hydrogen, said last-named means being in optical communication with said vessel within the confines of said cavity of said cavity resonator means.

3. In an apparatus according to claim 2; said light rays being the first line of the Lyman series for hydrogen, said directing means being provided with a pair of windows establishing, respectively, the optical communication between the source of said light rays and said directing means and between said directing means and said vessel, said optical system and said windows being made of lithium fluoride so as to minimize losses in the transmission of said light rays from said source thereof to said cavity.

4. In an apparatus according to claim 2; said optical system comprising mirror polarizer means adapted to deflect said light rays, when emanating from the source thereof in an unpolarized state, toward said vessel, the reflecting surface of said mirror polarizer means being so arranged that the angle of incidence of the unpolarized light rays thereon is the Brewster polarizing angle, whereby said light rays are plane-polarized parallel to said magnetic field.

5. In an apparatus according to claim 4; said optical system further comprising Fresnel rhomb means positioned between said mirror polarizer means and said cavity resonator means and adapted to circularly polarize the plane-polarized light rays coming from said mirror polarizer means.

6. Microwave apparatus comprising cavity resonator means dimensioned for the desired frequency of microwave energy to be radiated, a closed vessel extending through the cavity of said cavity resonator means and containing molecular hydrogen adapted to be dissociated into atomic hydrogen, an electron-emitting cathode and an anode arranged in said vessel in the path of flow of said hydrogen toward said cavity, with said anode located intermediate said cathode and said cavity, means operatively connected with said anode and cathode for applying across the same an electrical potential sufficient to accelerate electrons emitted by said cathode toward said anode to energies ranging from 8.0 electron volts to 11.5 electron volts, the gas pressure in said vessel being higher than the pressure at which a gas discharge would take place whereby those of said emitted electrons which collide with hydrogen molecules dissociate the latter so that they enter said cavity as hydrogen atoms which can undergo transitions from a relatively lower ground state energy level to at least one relatively higher excited state energy level, means establishing a magnetic field across said cavity and across the location of said hydrogen atoms so as to split each of said energy levels into a plurality of sublevels, means for directing light rays into said cavity and into optical communication with said hydrogen atoms in said vessels in said cavity, and an optical system operatively combined with said light directing means for imparting to said light rays prior to their incidence on said hydrogen atoms such a state of polarization as to ensure that said valence electrons are excited to at least a first preselected higher one of said higher split energy sublevels and as to prevent transition of said valence electrons into a second lower preselected one of said higher split energy sublevels, whereby return of said electrons from said first preselected split energy sublevel to said second preselected split energy sublevel results in radiation of microwave energy the frequency of which is determined by the difference between said preselected first and second energy sublevels.

7. Apparatus according to claim 6, said apparatus also comprising means for directing microwave energy to be amplified against the hydrogen atoms within said cavity, whereby due to the conjoint action of said last-named microwave energy and said light rays, there is produced a substantially enhanced quantity of microwave energy, and means for conducting said enhanced quantity of microwave energy away from the region of said magnetic field.

8. Apparatus according to claim 6, said apparatus also comprising modulating means operatively connected with said means establishing said magnetic field to produce predetermined variations in the strength of said magnetic field, whereby the degree of splitting of said energy levels and thus the differences between those of said split energy sublevels in which electron transitions can take place may be correspondingly varied to produce the desired variation in the frequency of the radiated microwave energy.

9. Apparatus according to claim 6, said light rays being the first line of the Lyman series for hydrogen, said directing means being provided with a pair of windows establishing, respectively, the optical communication between the source of said light rays and said directing means and between said directing means and said vessel, said optical system and said windows being made of lithium fluoride so as to minimize losses in the transmission of said light rays from said source thereof to said cavity.

10. Apparatus according to claim 6, said optical system comprising mirror polarizing means adapted to deflect said light rays, when emanating from the source thereof in an unpolarized state, toward said vessel, the reflecting surface of said mirror polarizer means being so arranged that the angle of incidence of the unpolarized light rays thereon is the Brewster polarizing angle, whereby said light rays are plane-polarized.

11. Apparatus according to claim 10, said optical system further comprising Fresnel rhomb means positioned between said mirror polarizer means and said cavity resonator means and adapted to circularly polarize the plane-polarized light rays coming from said mirror-polarizer means.

References Cited by the Examiner

UNITED STATES PATENTS

| | | | |
|---|---|---|---|
| 2,884,524 | 4/59 | Dicke | 331—94 |
| 2,909,654 | 10/59 | Bloembergen | 330—4 |
| 2,940,050 | 6/60 | Dicke | 331—94 |
| 2,951,992 | 9/60 | Arditi | 331—94 |
| 2,955,262 | 10/60 | Arditi | 331—3 |

OTHER REFERENCES

Wittke: "Proceedings of the IRE," March 1957, pages 291–316.

ROY LAKE, *Primary Examiner.*

HERMAN KARL SAALBACH, ARTHUR GAUSS, *Examiners.*